United States Patent [19]

Sugihara et al.

[11] Patent Number: 4,819,332

[45] Date of Patent: Apr. 11, 1989

[54] OIL SUPPLY STRUCTURE OF CHAIN SAW

[75] Inventors: Hideo Sugihara, Owashi; Mitsukazu Takisita; Daijo Hirose, both of Gifu, all of Japan

[73] Assignee: Sugihara Rinki Co., Ltd., Gifu, Japan

[21] Appl. No.: 78,377

[22] Filed: Jul. 27, 1987

[30] Foreign Application Priority Data

Feb. 26, 1987 [JP] Japan ................................ 62-043398

[51] Int. Cl.$^4$ ................................................ B23D 59/04

[52] U.S. Cl. ....................................... 30/123.4; 30/383

[58] Field of Search ......................... 30/123.4, 383-387

[56] References Cited

U.S. PATENT DOCUMENTS 3,279,508 10/1966 Ehlen et al. ....................... 30/387 X
3,581,783 6/1971 Sandin ................................ 30/123.4
3,777,401 12/1973 Arff et al. ............................. 30/383

FOREIGN PATENT DOCUMENTS 873133 7/1949 Fed. Rep. of Germany ..... 30/123.4
908296 4/1954 Fed. Rep. of Germany ..... 30/123.4
2321316 11/1974 Fed. Rep. of Germany ........ 30/387

*Primary Examiner*—Douglas D. Watts
*Attorney, Agent, or Firm*—Michael D. Rechtin; Philip P. Mann

[57] ABSTRACT

An oil supply structure of a chain saw comprises a pair of rail portions which are provided on the outer circumference of the main body of a guide plate, a guide groove which is formed between the two rail portions, a pair of oil supply holes which penetrate the two rail portions from outside and which open toward the guide groove, a through hole which penetrates the main body of the guide plate without any connection with the guide groove, and a pair of connection channels which connect outer end openings of each oil supply hole and two outer end openings of the through hole. Lubricating oil is supplied from an outlet port of the main body of the chain saw to both sides of a saw chain and so forth through the through hole, connection channel and oil supply hole.

20 Claims, 9 Drawing Sheets

OIL SUPPLY STRUCTURE OF CHAIN SAW

FIELD OF THE INVENTION

This invention relates to a structure for oiling a chain saw, and more particularly to a structure for oiling a guide plate or saw chain and the like of a chain saw.

DESCRIPTION OF THE RELATED ART

A structure for oiling a saw chain of a chain saw in which, as shown in FIGS. 22(*a*) to 24, a guide plate 131 is provided with an oil supply port 132 is known. That is, the oil supply port 132 shown in FIGS. 22(*a*) and 22(*b*) is formed in such a manner that it penetrates both rails 134 of the guide plate 131 so as to communicate with a guide groove 133 formed in the guide plate 131. The oil supply port 132 shown in FIG. 23, penetrates one of the rail portions 134 at an angle, and the inner end thereof communicates with one side surface of the guide groove 133. The oil supply port 132 shown in FIG. 24 is formed by an oblong groove 135 which extends in the direction of the width (vertical direction) on the outer side surface of one rail portion 134 of the guide plate 131 and a through a hole 136 which is formed in such a manner that the hole opens toward the guide groove 133 from one end of the oblong groove 135.

Oil is forced by pressure from the main body of the chain saw in the direction indicated by the arrow (FIG. 24) and into the guide groove 133 through the oil supply port 132.

As shown in FIGS. 23 and 24, oil is supplied to only one side of the guide groove 133 of the guide plate 131. The oil therefore can be supplied to the portion between the inside of the rail portion 134 adjacent to the oil supply port 132 and a drive link 138 of a saw chain 137, and the portion between the outer circumference of the rail portion 134 adjacent to the oil supply port 132 and a side link 139 of the saw chain 137. However, oil can not be sufficiently supplied to the other portions, that is, the portion between the inner surface of the rail portion 134 opposite to the oil supply port 132 and the drive link 138 of the saw chain 137, and the portion between the outer circumference of the rail portion 134 opposite the oil supply port 132 and the side link 139 of the saw chain 137.

Furthermore, in the guide plate 131 in the related art, as shown in FIGS. 22(*a*) and 22(*b*), oil is intended to be supplied to the guide groove 133 from two sides thereof, but actually the oil is scooped up by the drive link 138 of the saw chain 137 as soon as it enters in the guide groove 133, so that the opposite side of the entrance is not sufficiently supplied with oil.

SUMMARY OF THE INVENTION

An object of the present invention is to provide an oil supplying structure for a chain saw which is capable of sufficiently supplying oil to the portion between the outer circumference of two rails of a main body of guide plate and a side link, between inner surfaces of a guide groove and two outer side surfaces of a drive link and the portion which connects the drive link and side link of a saw chain.

Another object of the peresent invention is to provide an oil supplying structure in which a through hole thereof is never choked with wood chips.

A further object of the present invention is to provide an oil supplying structure for a chain saw which is capable of sufficiently supplying oil to the portion between the inner surface of a rail portion which is located opposite to an outlet port and a drive link of a saw chain, between the outer circumference of the rail portion opposite to the outlet port and a side link of the saw chain and the portion which connects the drive link and the side link, whereby wear of the saw chaln, guide groove and the rail portion is prevented so as to improve durability of the main body of guide plate and the saw chain.

A still further object of the present invention is to provide an oil supplying structure for a chain saw which is capable of preventing an oil supply hole from choking with chips, whereby there is no need to frequently remove chips from an oil supply hole.

A still further object of the present invention is to provide an oil supplying structure for a chain saw which is capable of being adapted to various types of chain saws having outlet ports whose positions vary vertically.

A still further object of the present invention is to provide an oil supplying structure for a chain saw in which the cost of manufacturing the main body of a guide plate can be reduced.

A still further object of the present invention is to provide an oil supplying structure for a chain saw in which oil can be continuously supplied to a saw chain even if the saw chain jumps and separates from the rail.

A still further object of the present invention is to provide an oil supplying structure for a chain saw in which an insertion can be free from any runout in the area of a fitting hole in the direction of the thickness, whereby lubricating oil can be stably supplied.

A still further object of the present invention is to provide an oil supplying structure which is capable of supplying oil to two sides surfaces of a sprocket and an annular sliding portion of the sprocket which are provided at the front end of a main body of guide plate, and is capable of improving durability of the sprocket and the annular sliding portion.

A still further object of the present invention is to provide an oil supplying structure for a chain saw which is capable of supplying oil to two sides at any positions in the guide groove whereby efficiency in lubrication is improved.

In order to achieve the above objects, the structure of the present invention comprises a pair of rail portions which are provided in the outer circumference of the main body of a guide plate, a guide groove which is formed between two rail portions, a pair of oil supply holes which open toward the guide groove and penetrate the two rail portions from outside, a through hole which penetrates the main body of guide plate without any connection with the guide groove and a pair of connection channels which connect outer openings of oil supply holes and two outer openings of the through hole.

Other and further objects of this invention will become obvious upon an understanding of the illustrative embodiments to be described or will be indicated in the appended claims, and various advantages not referred to herein will occur to one skilled in the art upon employment of the invention in practice.

BRIEF DESCRIPTION OF THE DRAWINGS

FIG. 7(*b*) is a front view of the structure shown in FIG. 7(*a*);

FIGS. 7(*c*), 7(*d*) and 8 are partial enlarged cross sectional views illustrating another embodiment of the insertion;

FIG. 12(*b*) is a partial enlarged sectional view illustrating an insertion inserted in the fitting hole and the securing recess;

FIG. 16(*b*) is a partial enlarged cross sectional view illustrating another embodiment in which a connection channel is defined by a recess formed on a main body of chain saw or on a chain cover.

FIG. 16(*c*) is a partial enlarged cross sectional view illustrating another embodiment in which a connection channel is defined by a cutout formed on a protector washer.

FIG. 17(*b*) is a partial enlarged cross sectional view illustrating an insertion having oil supply holes installed to the main body of guide plate;

FIG. 17(*c*) is a partial enlarged front view of the structure shown in FIG. 17(*b*);

FIG. 20(*b*) is an enlarged cross sectional view of the major parts of the structure shown in FIG. 20(*a*);

FIGS. 22(*a*), 22(*b*), 23 and 24 are partial cross sectional views illustrating related art of this invention.

DETAILED DESCRIPTION OF THE PREFERRED EMBODIMENT

Figure 1:
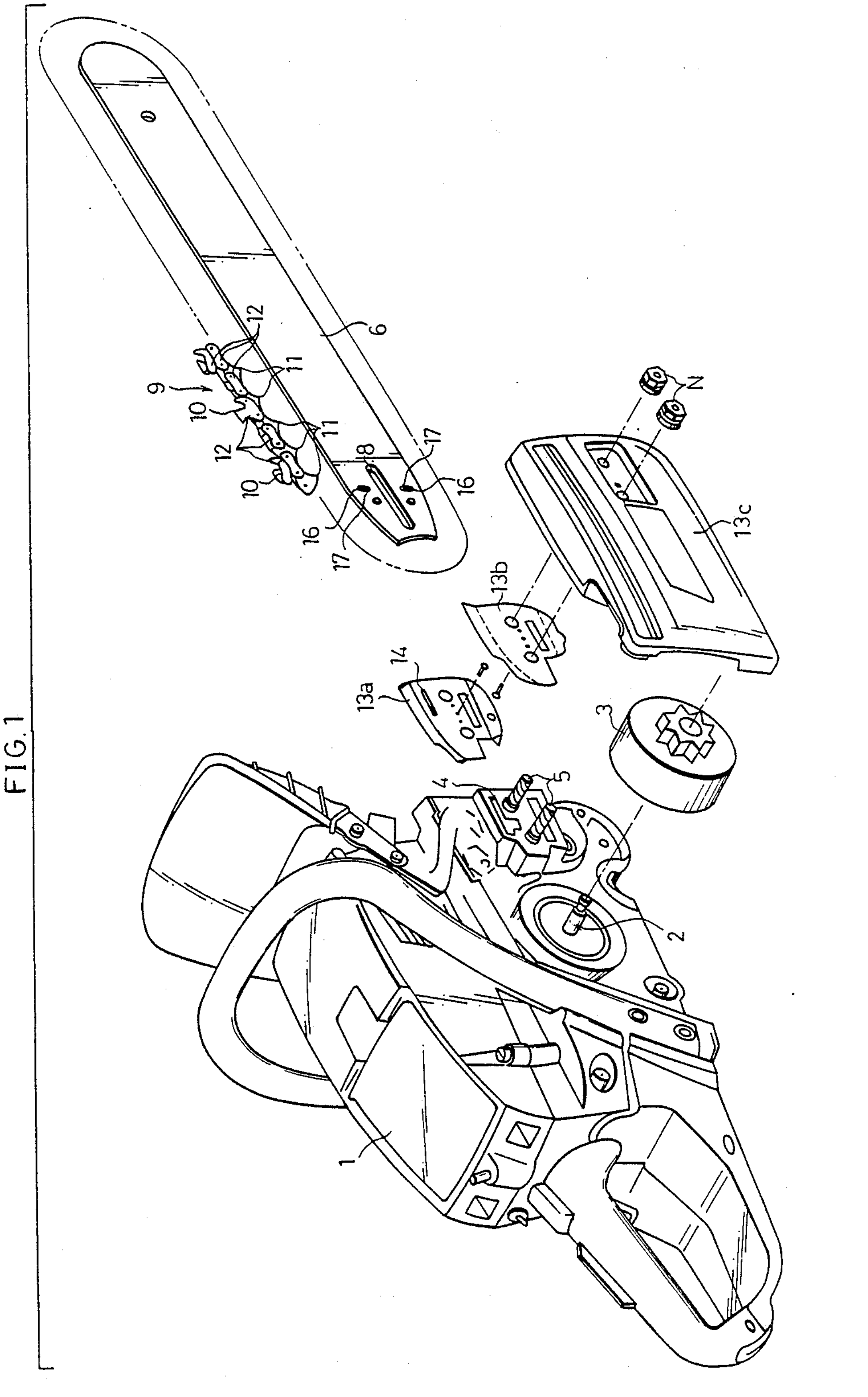
FIG. 1 is an exploded perspective view illustrating an embodiment of the present invention.
Figure 4:
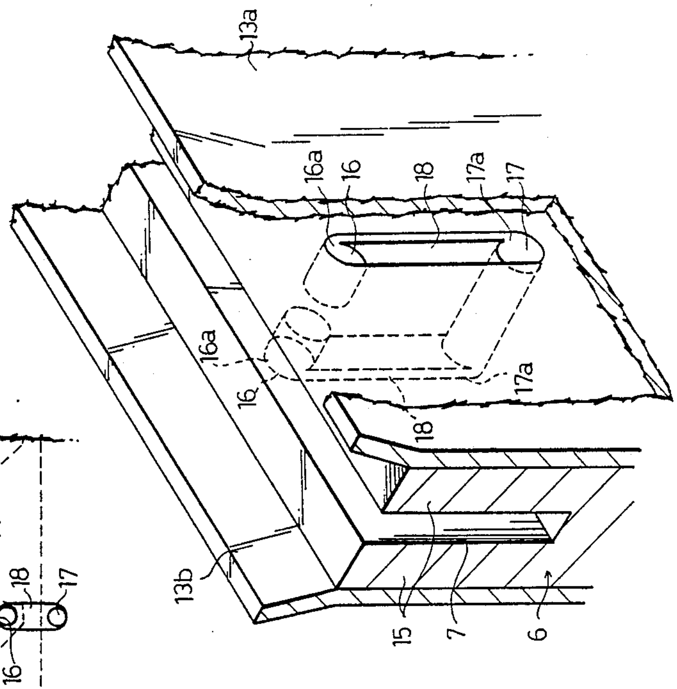
FIG. 4 is a partial perspective view illustrating a portion around an oil supply hole in the main body of the guide plate.
Figure 3:
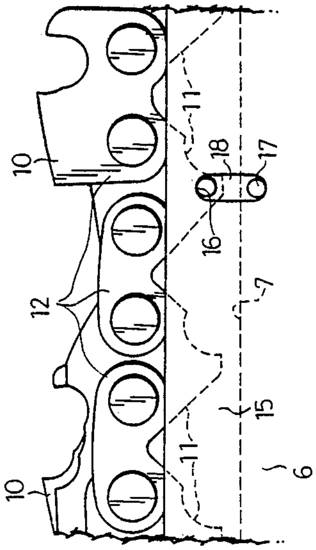
FIG. 3 is a partial front view of the structure shown in FIG. 2.

Referring to FIGS. 1–4, an embodiment of the present invention will now be described.

Reference numeral 1 represents a main body of a chain saw having a drive shaft 2 on one side thereof. Reference numeral 3 represents a sprocket which is secured to the drive shaft 2. The sprocket transmits driving force of the main body from chain saw 1 to a saw chain to be described hereinafter.

Reference numeral 4 represents a lubricating oil outlet port which opens in front (right hand in FIG. 1) of the drive shaft 2 in the main body of chain saw 1. Reference numeral 5 represents a pair of bolts which are positioned in the lower portion of the outlet port 4.

Reference numeral 6 represents a main body of a guide plate which is to be secured to the main body of the chain saw 1. The guide plate 6 is longitudinally adjustablly secured to the chain saw 1 by tightening a nut N after inserting a bolt 5 projecting from the main body of above chain saw 1, into an oblong hole 8 which is defined at a base end of the main body of guide plate 6. The main body of guide plate 6 is integrally formed.

Reference numerals 13*a* and 13*b* represent a pair of protector washers which are installed between the base end of the above main body of guide plate 6 and which are the main body of chain saw 1, and installed to the outer side of the base end of the main body of guide plate 6. The protector washer 13*a* is provided with a through hole 14 which is located in accordance with the outlet port 4 in the main body of chain saw 1. Reference numeral 13*c* represents a chain cover which is secured to the outer side of the protector washer 13*b*, and serves to cover the above sprocket 3 as well.

Figure 2:
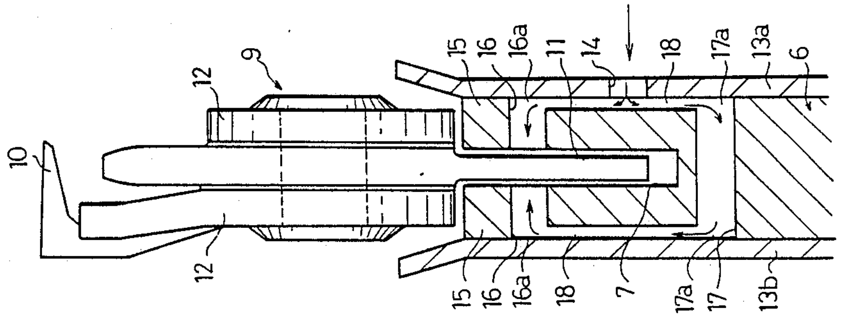
FIG. 2 is a partial enlarged cross sectional view illustrating a saw chain mounted onto a main body of a guide plate.

As shown in FIG. 2 reference numeral 7 represents a guide groove which is provided in the form of a recess, and is located on the outer circumference of the above main body of guide plate 6. Reference numeral 15 represents a pair of rails which are provided on the outer circumference of the above main body of guide plate 6.

Reference numeral 9 represents an endless saw chain which is movably disposed in the guide groove 7 of the main body of guide plate 6. The saw chain 9 is adapted to be driven by a driving force provide by the main body of chain saw 1 through the sprocket 3. The saw chain 9 is formed of drive links 11, which are disposed in the guide groove 7 of the above main body of guide plate 6, and which are driven by the sprocket 3 of the main body of chain saw 1, and side links 12. Some of these side links 12 have blades 10 in the upper portions thereof, and the links 12 which are provided with a blade 10 are arranged at a predetermined interval. The drive link 11 is adapted to supply lubricating oil introduced through the outlet port 4 in the main body of chain saw 1 to the whole body of the guide groove 7 through both sides for the purpose of preventing seizure of the saw chain 9 and wear of the guide groove 7, and for the purpose of removing chips from the bottom portion of the guide groove 7.

As shown in FIGS. 1 and 2, reference numeral 16 represents a pair of right hand and left hand (FIG. 2) oil supply holes which are located on the upper portion and the lower portion of the base end of the main body of guide plate 6, and which penetrates a rail portion 15 in the direction of the thickness thereof so as to open in the guide groove 7. This oil supply hole 16 is located adjacent the outer circumference of the main body of guide plate 6. Reference numeral 17 represents through holes which penetrate the main body of the guide plate 6 closer to the longitudinal axis of the guide than do the oil supply holes 16. These through holes 17 penetrate the main body of guide plate 6 in the direction of the thickness at a position which does not correspond to the guide groove 7. Reference numeral 18 represents a connection channel which connects each outer end opening 17*a* of the through hole 17 and each outer end opening 16*a* of the above oil supply hole 16. The connection channels 18 are respectively formed on two outer side surfaces of the main body of guide plate 6. Each connection channel 18 is covered by the protector washers 13*a* and 13*b* from outside, and a part of the connection channel 18 adjacent to the outlet port 4 is in accordance with the position of the hole 14 of the outer protector washer 13*a*.

The operation of the chain saw whose structure is mentioned above will now be described.

In normal use, lubricating oil is supplied into the guide groove 7 from both sides of the drive link 11 of the saw chain 9 through the outlet port 4 of the main body of chain saw 1, as shown by the arrow in FIG. 2, and through the hole 14 of the protector washer 13*a*, the through hole 17 of the main body of guide plate 6, two connection channels 18, and two oil supply holes 16. The lubricating oil is then fed to the whole circumference of the main body of guide plate 6 by means of the running drive links 11 of the saw chain 9. The lubricating oil is sufficiently supplied to the portion between the outer circumferences of two rail portions 15 of the main body of guide plate 6, between the inner surface of the guide groove 7 and two outer side surfaces of the drive link 11, and the portion which connects the drive link 11 of the saw chain 9 and the side link 12.

Since the through hole 17 has no connection with nor opens into the guide groove 7, the through hole 17 is prevented from choking or with clogging wood chips or sawdust at the guide groove portion 7.

In this embodiment, the lubricating oil is supplied from a pair of right and left oil supply holes 16 to two side surfaces of the drive link 11 of the saw chain 9, and the oil supply hole 16 is located adjacent the outer circumference of the main body of guide plate 6. The portions to which the lubricating oil is not sufficiently supplied in the related art, that is, a portion between the inner surface of the rail portion 15 which is located opposite to the outlet port 4 and the drive link 11 of the saw chain 9, the portion between the outer circumference of the rail portion 15 which is located opposite to the outlet port 4 and the side link 12 of the saw chain 9 and the portion which connects the drive link 11 and the side link 12, can now be sufficiently supplied with oil. The saw chain 9, guide groove 7 and rail portion 15 are therefore prevented from wear, and durability of the main body of guide plate 6 and the saw chain 9 are thus improved.

Since the oil supply hole 16 penetrates the rail portion 15 across its thickness and completely crosses the drive link 11, the drive link 11 removes chips such as wood and so forth from the oil supply hole 16, and prevents the oil supply hole 16 from choking with chips when the drive link 11 moves. Therefore, it isn't necessary to frequently detach the main body of guide plate 6 and saw chain 9 from the main body of chain saw 1 and remove the chips from inside the oil supply hole 16.

As the connection channel 18 in the form of an oblong hole is vertically provided in the outer side surface of the main body of guide plate 6, the main body of guide plate 6 in this embodiment can be applied to various types of main bodies of the chain saws 1 having the outlet ports 4 which are locate at various positions. Namely, the hole 14 of the protector washer 13*a* which is connected to the outlet port 4 may be located at any position over the whole length from the through hole 17 to the oil supply hole 16.

If the position of the main body of guide plate 6 of the chain saw according to this embodiment is vertically turned with respect to the main body of chain saw 1, the oil supply holes 16, through hole 17 and the connection channel 18 which are located in the lower portion correspond to the outlet port 4 in the main body of chain saw 1.

Figure 5:
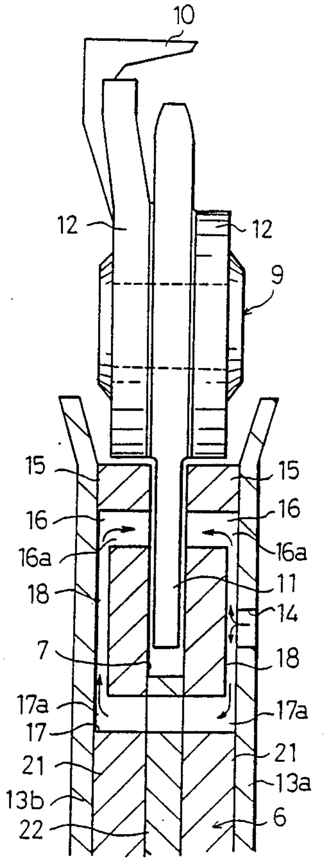
FIGS. 5 and 6 are cross sectional views illustrating another embodiment of the main body of a guide plate.

This invention is not limited to the above embodiments, for example, the main body of guide plate 6 is formed, as shown in FIG. 5, by interposing a center plate 22 between a pair of side plates 21 so as to make a recess portion which is formed between the two side plates 21 as a guide groove 7. In this case, the manufacturing cost can be reduced in comparison with the integrally formed main body of guide plate 6 because a precise manufacturing is unnecessary for the guide groove 7.

Figure 6:
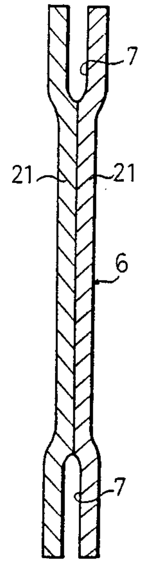
Figure 7A:
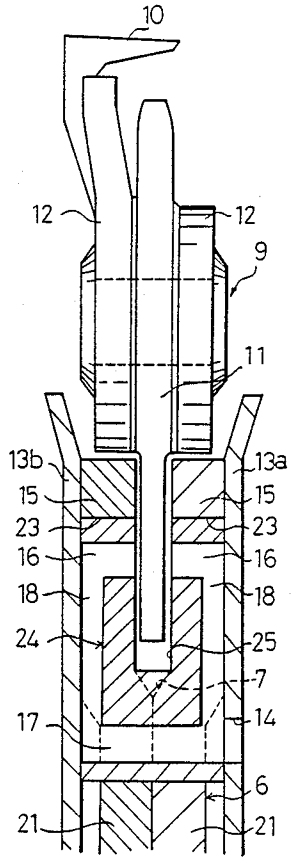
FIG. 7(*a*) is a partial enlarged cross sectional view illustraing an insertion inserted into the main body of guide plate.
Figure 7B:
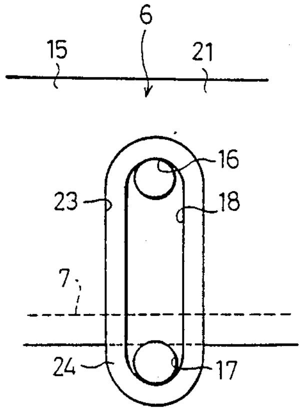
Figure 7C:
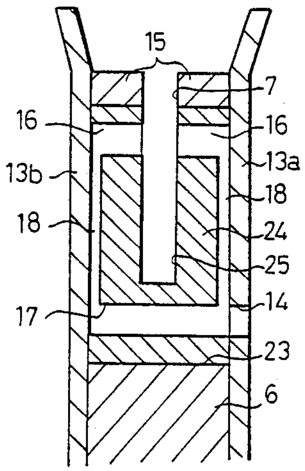
Figure 7D:
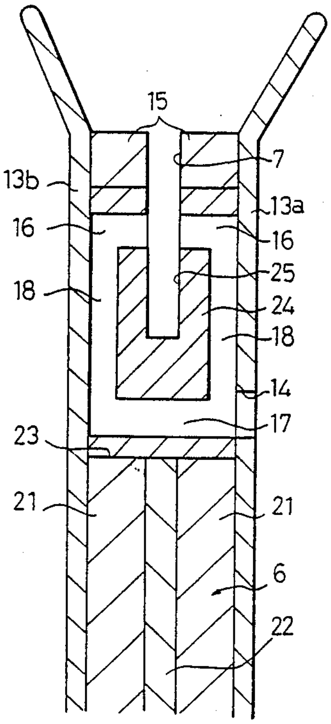

As shown in FIG. 6, the main body of guide plate 6 may be designed so that the circumferetial portions of a pair of side plates 21 are bent outward to make a recess portion between two side plates 21 defining the guide groove 7 and in which circumferential portions of the two side plates 21 form the rail portions 15. As shown in FIGS. 7(*a*) and 7(*b*), a fitting hole 23 in the form of an oblong hole may penetrate the main body of guide plate 6 at the position adjacent the outer circumference of the rail portion 15 so as to extend inwardly relative to the rail portion in FIG. 7(*a*) and (*b*)). An insert 24 having, identically to the previous embodiment, the oil supply hole 16, the through hole 17 and the connection channel 18 may be fitted into the fitting hole 23. A groove 25 may be provided in the form of a recess at a center portion in the direction of the thickness of the insert 24 in accordance with the position of the guide groove 7 of the main body of guide plate 6. The insert 24 may be employed in the main body of guide plate 6 which is formed by a single plate or three laminated plates as shown in FIGS. 7(*c*) and 7(*d*).

Figure 8:
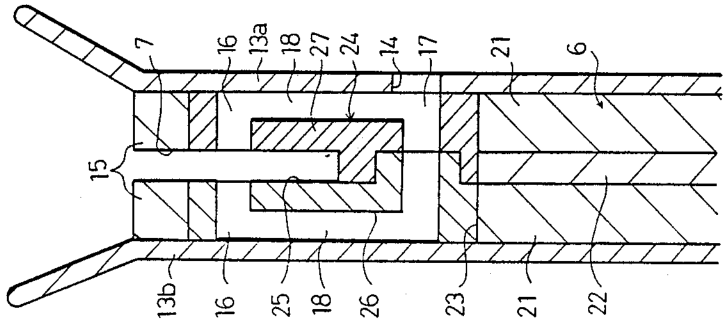

Moreover, although the insert 24 is to be formed integrally, it may be formed by combination of a plurality of members 26 and 27 as shown in FIG. 8.

Figure 9B:
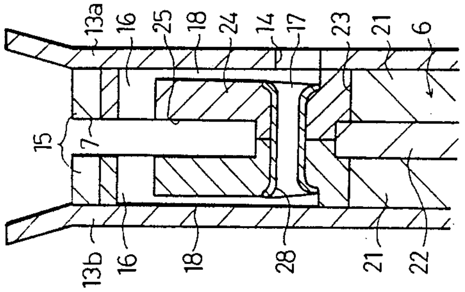
FIGS. 9(*a*) and 9(*b*) are partial enlarged cross sectional views illustrating another embodiment of a through hole.
Figure 9A:
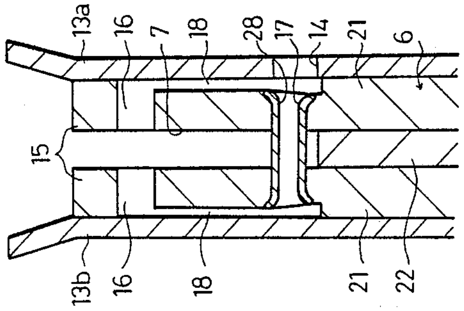

The through hole 17 may be formed, as shown in FIGS. 9(*a*) and 9(*b*), by fitting a tubular pipe 28 to the main body of guide plate 6 in such a manner that the pipe 28 penetrates the two rail portions 15, or may be formed by fitting the pipe 28 in such a manner that the pipe 28 penetrates the insert 24 in the direction of its thickness.

Furthermore, the vertical position of the oil supply hole 16 in the main body of guide plate 6 may be higher or lower than in the previous embodiment, and the number of oil supply holes 16 and the through holes 17, and the shapes of the supply holes 16, the through holes 17, or the connection channel 18 and the shape of the insert 24 may be designed at will.

Figure 10:
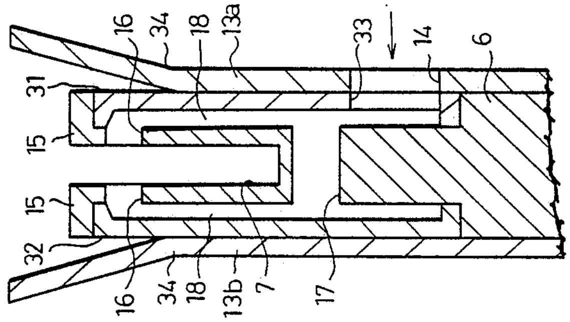
FIG. 10 is a partial enlarged cross sectional view illustrating a cover installed onto the main body of a guide plate.

Although in the previous embodiment, the oil supply hole 16, through hole 17 and the connection channel 18 are covered by the protector washers 13*a* and 13*b* from outside, in another embodiment shown in FIG. 10 the holes 16, 17 and the channel 18 are each covered by a pair of covers 31 and 32 from the outside. A connecting hole 33 is formed on the cover 31 adjacent to the outlet port 4 at the position corresponding to the position of the hole 14 of the protector washer 13*a*. According to the structure of the embodiment hereinbefore described, the oil supply hole 16 can be provided closer to the outer circumference of the main body of the guide plate 6 without any concern for the position of the bent portion 34 of the protector washers 13*a* and 13*b*. As a result of this provision, the lubricating oil can be more efficiently supplied to the saw chain 9. Especially, the supply of the lubricating oil to the saw chain 9 is never disturbed even if the saw chain 9 separates from the rail portion 15 due to jumping during its running.

Figure 13:
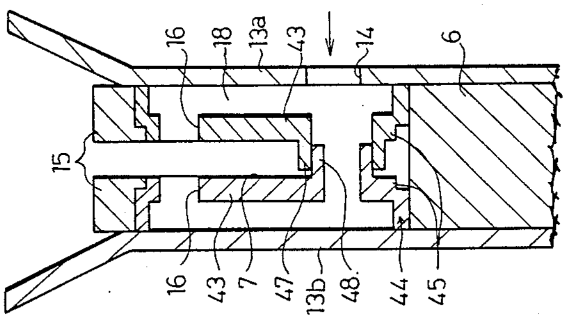
FIG. 13 is a partial enlarged cross sectional view of the structure shown in FIG. 13.
Figure 12B:
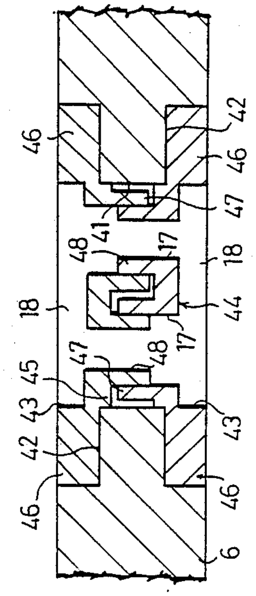
FIG. 12(*a*) is an exploded perspective view illustrating an insertion adapted to be inserted in the fitting hole and the securing recess of FIG. 11.
Figure 11:
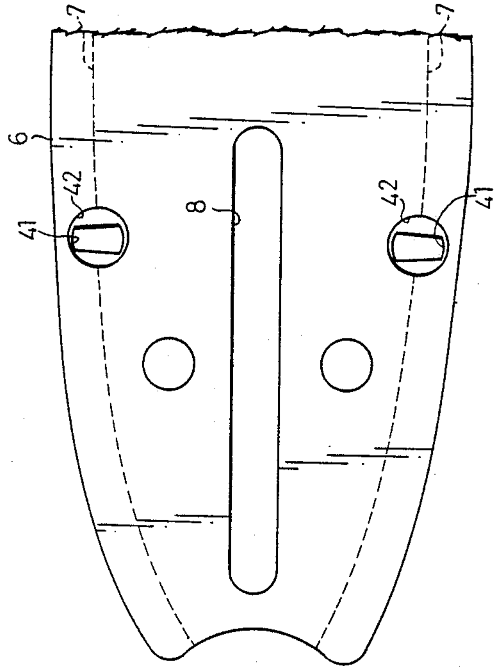
FIG. 11 is a partial enlarged front view illustrating a fitting hole and a securing recess.
Figure 12A:
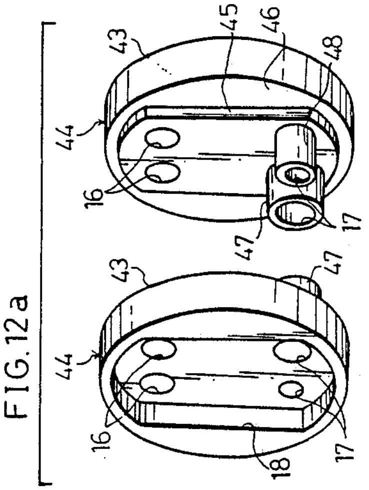

In another embodiment shown in FIGS. 11 to 13, fitting holes 41 which extend across of the width of the main body of guide plate 6 respectively penetrate the upper portion and the lower portion of the base end of the main body of the guide plate 6. These holes are preferably formed by stamping. An annular securing recess 42 of almost the same diameter as the length of the fitting hole 41 is formed in the outer circumference of the fitting hole 41 on two sides of the main body of guide plate 6 across the thickness thereof. The annular recesses 42 are preferably formed cutting or grinding. An insert 44 consisting of a pair of members 43 of the same form is inserted into the fitting hole 41 from both sides. A step portion 45 shaped to fit into the fitting hole 41 is formed on the side surface of each disk shape member 43 and an engaging portion 46 shaped to be received in the securing recess 42 is provided on the outer circumference of the step portion 45. A tubular large diameter fitting portion 47 and a tubular small diameter fitting portion 48 having an outside diameter which is equal to an inside diameter of the large diameter fitting portion 47 are formed below the step portion 45. The small diameter fitting portion 48 of one member 43 is received in the large diameter fitting portion 47 of the other member 43 while the small diameter fitting portion 48 of the other member 43 is received in the large diameter fitting portion 47 of one member 43, whereby both members 43 are joined to each other. A pair of through holes 17 are formed by inside surfaces of both fitting portions 47, 48 and there are provided a pair of the oil supply holes 16 through each member 43.

In this modification, the insert 44 is free from any runout in the area of the fitting hole 41 in the direction of the thickness because when both members 43 are joined, their engaging portions 46 come in contact with the securing recesses 42. Therefore, the positions of both the holes 16, 17 and the channel 18 at the main body of the guide plate 6 are always constant, whereby lubricating oil can be continuously supplied. On the other hand, the mating portions 47, 48 of both members 43 need not be perfectly joined. For example, even if they are joined about half way the cooperative engagement of both the members 43 is maintained. Accordingly, so long as the depth of the securing recess 42 is substantially equal to the thickness of the engaging portion 46, this modification can be used also for the main body of a guide plate 6 having a different thickness. Moreover, in the embodiment shown in FIGS. 1 to 5, the connection channel 18 is necessarily provided by cutting or grinding on both sides of the main body of guide plate 6, the oil supply hole 16 and the through hole 17 are thereafter respectively drilled. However, in this modification the fitting hole 41 is formed by stamping while the securing recess 42 is formed by cutting or grinding. Accordingly the work efficiency during the manufacturing can be improved and manufacturing cost reduced.

Figure 14:
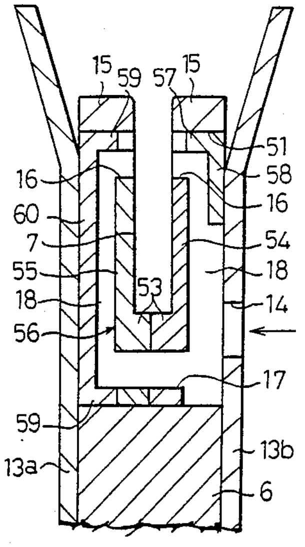
FIG. 14 is a partial enlarged cross sectional veiw illustrating an insertion and a cover installed to a fitting hole.
Figure 15:
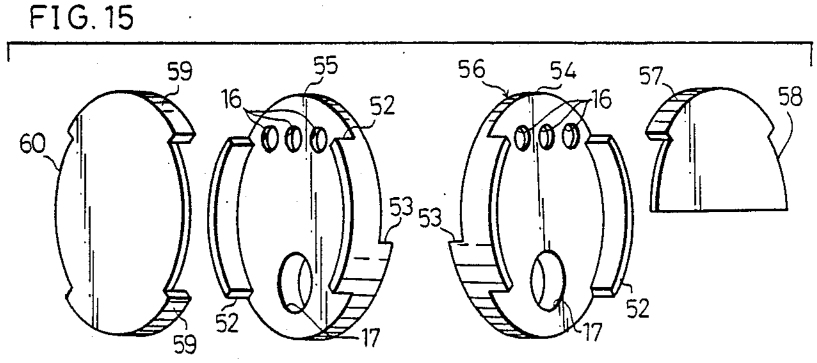
FIG. 15 is an exploded perspective view illustrating the insertion and the cover shown in FIG. 14.

Another embodiment is shown in FIGS. 14 and 15. The insert 56, which consists of a pair of elliptical members 54 and 55 having a pair of flanges 52 on both sides of the outer circumference and a step portion 53 on the backside, is fitted into an elliptical fitting hole 51. A cover 58 in the form of a semi-elliptical disc having a flange 57 at the upper circumference is inserted from the outside of the member 54 adjacent to the outlet port 4 so as to be received into the fitting hole 51 and engaged with the member 54. An elliptical cover 60 having flanges 59 in both upper and lower portions of the outer circumference is inserted from outside the other member 55 so as to be fitted into the fitting hole 51 and to be engaged with the member 55. This modification can provide effects similar to those obtained in the modification shown in FIG. 10. Furthermore, it can be applied to the main body of chain saw 1 having an outlet port 4 whose vertical position, varies because the cover 58 adjacent the outlet port 4 is in the form of an elliptical disc.

Figure 16A:
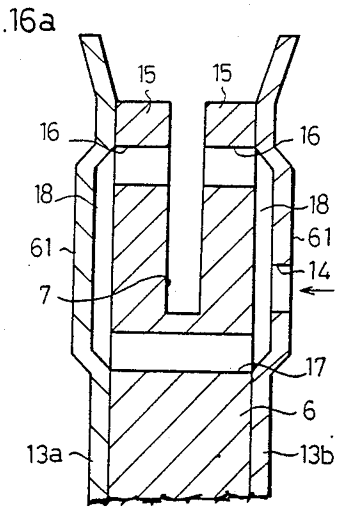
FIG. 16(*a*) is a partial enlarged cross sectional view illustrating protector washers having projections installed to the main body of guide plate.
Figure 16B:
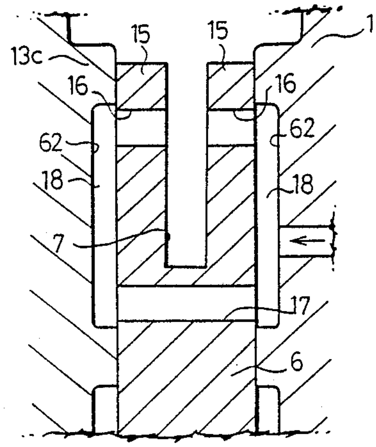
Figure 16C:
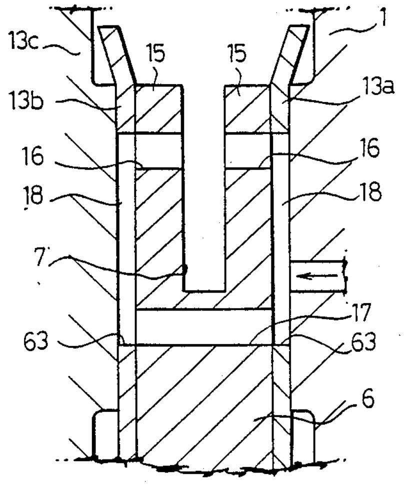

A further modification is shown in FIG. 16(*a*) in which a projecting portion 61 is formed in the two protector washers 13*a* and 13*b* as an alternative to the connection channel 18 provided in the main body of the guide plate 6 so as to connect the oil supply hole 16 and the through hole 17. A further modification is shown in FIG. 16(*b*) in which both the protector washers 13*a* and 13*b* are omitted and the connection channels 18 are defined by forming recess portions 62 on the main body of chain saw 1 and the chain cover 13*c*. A further modification is shown in FIG. 16(*c*) in which the connection channels 18 are defined by forming cutout portions 63 on the protector washers 13*a* and 13*b* and covering the cutout portions 63 by the main body of chain saw 1 and the chain cover 13*c* from outside.

Figure 17C:
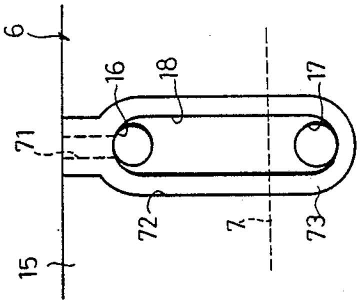
FIG. 17(*a*) is a partial enlarged cross sectional view illustrating the main body of a guide plate having oil supply grooves.
Figure 17B:
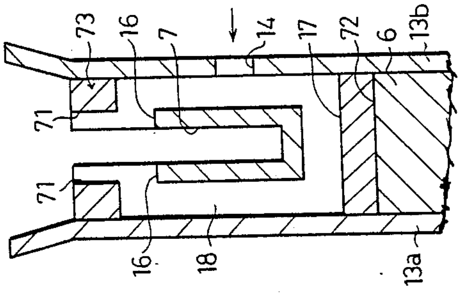
Figure 17A:
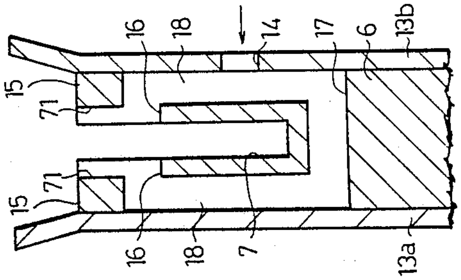

A still further modification is shown in FIG. 17(*a*) in which an oil supply groove 71 which opens toward the outer peripheral edge of the rail portion 15 is formed from the oil supply hole 16 for the purpose of smoothly supplying oil to the side link 12. In this modification, as shown in FIGS. 17(*b*) and 17(*c*), the structure may be so arranged that an insert 73 having the oil supply groove 71 may be inserted into a fitting hole 72 which opens toward the outer pheripheral edge of the rail portion 15.

Figure 19:
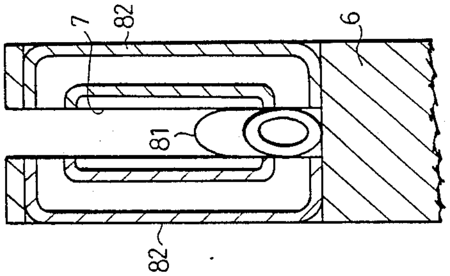
FIG. 19 is a cross sectional view taken along line 19—19 in FIG. 18.
Figure 18:
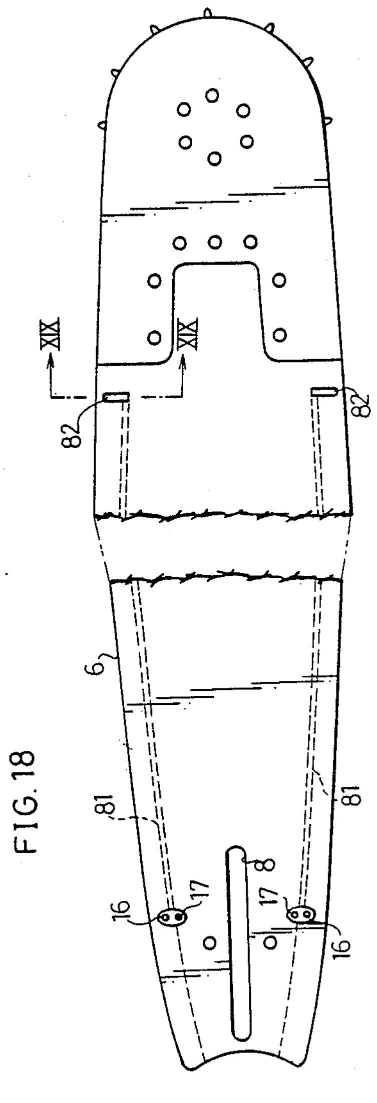
FIG. 18 is a partial front view illustrating connection pipes and a main body of guide plate to which oil supply pipes are installed.

A further modification is shown in FIGS. 18 and 19 in which a pair of connection pipes 81 are arranged in the bottom surface of the guide groove 7 in both the upper and lower portions of the main body of guide plate 6. Lubricating oil is introduced from the through hole 17 to a pair of oil supply pipes 82 which are provided on another portion of the main body of guide plate 6 in the direction of the thickness through each connection pipe 81 for the purpose of supplying oil to both sides in a desired portion of the guide groove 7.

According to this modification, because oil can be supplied to both sides of the saw chain 9 at any position of the guide groove 7, efficient lubrication can be provided, particularly, for a guide plate of considerable length.

Figure 20A:
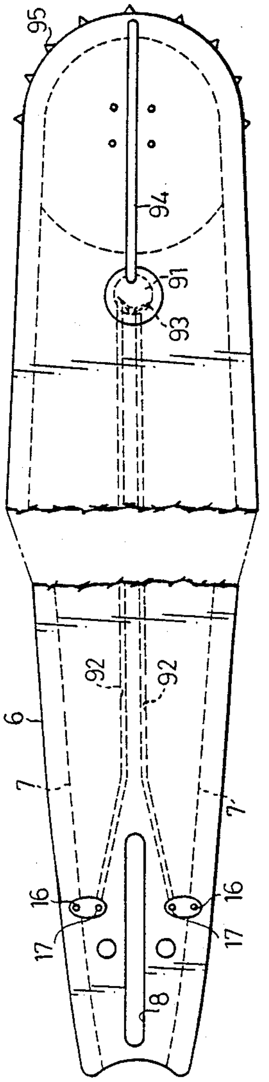
FIG. 20(*a*) is a partial front view illustrating an oil supplying structure for supplying oil to an outer circumferential portion of a sprocket.
Figure 20B:
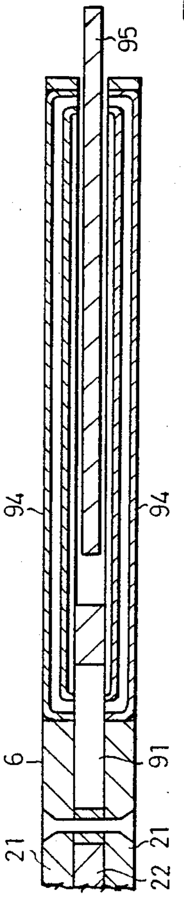

Another embodiment is shown in FIGS. 20(*a*) and 20(*b*) in which a pair of connection grooves 92 extend from a through hole 17, of formed in the main body of guide plate 6 of the triple layer form shown in FIG. 5, to an oil chamber 91 which is formed at the front end of the main body of guide plate 6, and through a center portion of the main body of guide plate 6 across its width. The oil chamber 91 is provided with a check valve 93 operable to prevent the lubricating oil which has been introduced from the one connection groove 92 from leaking into another groove 92. A pair of oil supply pipes 94 are interposed between the oil chamber 91 and the outer circumference at the front end of the main body of guide plate 6 on two sides of the main body of guide plate 6 for the purpose of supplying oil from the oil chamber 91 to both sides of a sprocket 95.

According to this embodiment, because oil can be supplied not only to the saw chain 9, but also to both sides of the sprocket 95, durability of not only the main body of guide plate 6 and saw chain 9 but also the sprocket 95 can be improved. Furthermore, oil may be supplied to both sides only by interposing the oil supply pipe 94 between the respective connection groove 92 and the outer circumference at the front end of the main body of guide plate 6 while omitting the oil chamber 91 and the check valve 93, whereby the manufacturing cost is lower than when the oil chamber 91 and the check valve 93 are provided.

Figure 21A:
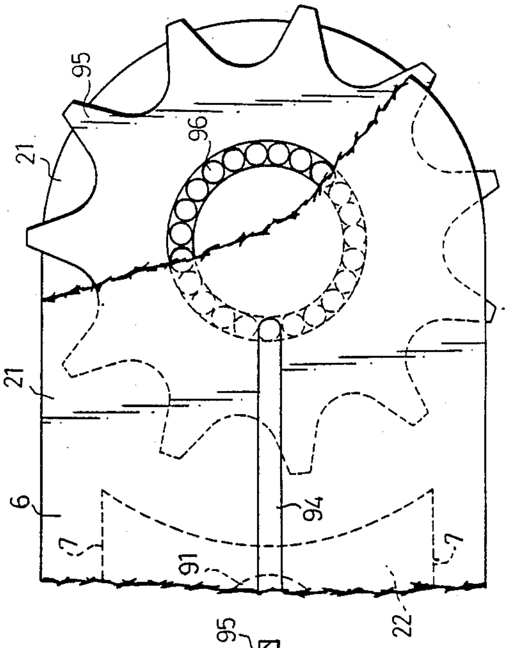
FIG. 21(*a*) is a partial front view illustrating an oil supplying structure for supplying oil to a bearing portion of a sprocket FIG. 21(*b*) is an enlarged cross sectional view of the major parts of the structure shown in FIG. 21(*a*)
Figure 21B:
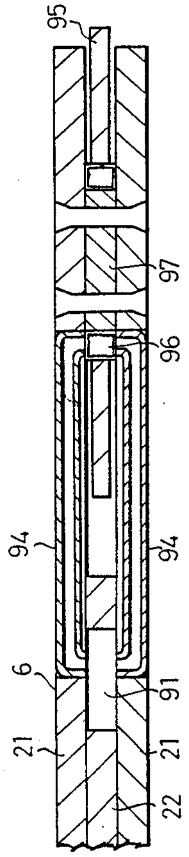

As shown in FIGS. 21(*a*) and 21(*b*), the structure may be so arranged that the oil supply pipe 94 of the above modification supplys oil to a bearing 96 which serves as an annular sliding portion of the sprocket 95. In this case, the durability of the bearing 96, which is more prone to wear than the other members, can be improved.

Moreover, a vibration proof plate made of vibration proofing material such as flexible metal (e.g. lead) or vibration proof rubber and so on can be used as the center plate 22 in the aforesaid embodiment or modifications in which the main body of guide plate 6 is formed in the triple layers structure. In this case, vibration during the operation of chain saw is reduced, whereby the work is performed more safely and controllably.

The modifications shown in FIGS. 10 to 19 can be applied not only to the main body of guide plate 6 which is integrally formed but also to that in multilayer structures such as double layers, triple layers, five layers and so on.

Moreover, an insert structure can be employed in the modifications shown in FIGS. 10, 16, 18 and 20.

Furthermore, the inserts 24, 44, 56, 73 may be attached to the fitting hole by adhesive, rivets, bolts, welding, spot welding and so forth, in addition to the aforementioned inserting.

As many apparently widely different embodiments of this invention may be made without departing from the spirit and the scope thereof, it is to be understood that the invention is not limited to the specific embodiments thereof except as defined in the appended claims.

What is claimed is:

1. An oil supply structure of a chain saw comprising:

a guide plate adapted to support a driven chain and including a pair of circumferentially extending rail portions;

a guide groove formed between said rail portions;

a pair of oil supply holes penetrating said rail portions and opening into said guide groove;

a through hole penetrating said guide plate without any connection with said guide groove; and a pair of connection channels arranged to connect one end of each of said oil supply holes with an end of the through hole.

2. An oil supply structure of a chain saw according to claim 1, further comprising a fitting hole which penetrates the outer circumference of said guide plate across the thickness thereof and an insert inserted into said fitting hole, said insert having therein formed said oil supply hole, said through hole and said connection channel.

3. An oil supply structure of a chain saw according to claim 2, further comprising a first cover adapted to extend from a supply of lubricating oil to said fitting hole and partially covering an outer side surface of said insert and further comprising a second cover extending from a side opposite the supply of lubricating oil to said fitting hole and covering entirely an outer side portion of said insert.

4. An oil supply structure of a chain saw according to claim 2, wherein said fitting hole opens toward the outer peripheral edge of said rail portion, and said insert further comprises an oil supply groove opening from each said oil supply hole toward the outer peripheral edge of said rail portion.

5. An oil supply structure of a chain saw according to claim 2, wherein said through hole is formed by a pipe which penetrates said insert across the thickness thereof.

6. An oil supply structure of a chain saw according to claim 2, wherein said insert comprises at least a pair of members capable of coupling together.

7. An oil supply structure of a chain saw according to claim 6, further comprising securing means formed in the outer circumference of said fitting hole on both sides of said guide plate across the thickness thereof, said insert having a pair of members capable of being coupled together, said pair of members having engaging means adapted to be engaged with said securing means to prevent runout of said insert in the direction of the thickness of said fitting hole.

8. An oil supply structure of a chain saw according to claim 7, wherein said two members are of substantially the same form and include respectively a tubular large diameter fitting portion and a tubular small diameter fitting portion having an outside diameter substantially equal to the inside diameter of said large diameter fitting portion, said small diameter fitting portion of one member being adapted to fit into said large diameter fitting portion of the other member while said small diameter fitting portion of the other member fits into the large diameter fitting portion of said one member thereby joining both of said members to each other, said joined members defining said through hole.

9. An oil supply structure of a chain saw according to claim 1, wherein said guide plate comprises a pair of side plates and a center plate interposed between said side plates, and said guide groove is formed between the outer peripheral edges of said side plates.

10. An oil supply structure of a chain saw according to claim 9, wherein said guide plate further comprises an oil supply pipe arranged on said side plate in such a manner that one end of said pipe opens toward a part of a sprocket provided at the front end of said side plate and a connection groove which is formed in said center plate so as to connect said through hole and the other end opening of said oil supply pipe to introduce lubricating oil from said through hole into said oil supply pipe.

11. An oil supply structure according to claim 1, wherein said guide plate is integrally formed and a recess portion is formed in the outer circumference of said guide plate to serve as said guide groove.

12. An oil supply structure of a chain saw according to claim 1, wherein said guide plate is formed by a pair of side plates, and said guide groove is formed between outwardly bent outer circumferences of said side plates.

13. An oil supplying structure of a chain saw according to claim 1, wherein said through hole is formed by a pipe penetrating said two rail portions.

14. An oil supply structure of a chain saw according to claim 1, further comprising an oil supply pipe provided on at least one portion of said outer circumference of said guide plate and having both ends opened to a bottom portion and outer circumference portion of said guide groove and a further comprising connection pipe interposed between said through hole and said opening in the bottom portion of said oil supply pipe so as to introduce lubricating oil from said through hole into said oil supply pipe.

15. An oil supply structure of a chain saw according to claim 1, further comprising a pair of covers adapted to cover said oil supply hole, said through hole and said connection channel from the extension of said guide plate.

16. An oil supply structure of a chain saw according to claim 1, further comprising a pair of protector washers provided on both sides of said guide plate across the thickness thereof, each protector washer having a projecting portion protecting over said oil supply hole to said through hole so as to connect said oil supply hole and said through hole.

17. An oil supply structure of a chain saw according to claim 1, wherein said chain saw further includes a main body and a chain cover and wherein said connection channel is defined by a recess portion formed on said main body of said chain saw and on said chain cover so as to connect said oil supply hole and said through hole.

18. An oil suply structure of a chain saw according to claim 17, further comprising a pair of protector washers provided on both sides of said guide plate across the thickness thereof, each protection washer having a cutout formed over said oil supply hole and extending to said through hole, said connection channel being defined by said cutout, said main body of chain saw and said chain cover.

19. An oil supply structure of a chain saw according to claim 1, further comprising an oil supply groove which opens from said oil supply hole to the outer peripheral edge of said rail portion.

20. An oil supply structure operable to supply oil to the chain of a chain saw, said oil supply structure comprising:

a guide bar having a periphery adapted to support thereon a driven chain and including a first passageway communicating with one side of the chain and a second passageway communicating with the diametricly opposite side of the chain on the same side of the guide bar; and means communicating within said guide bar and with each of said first and second passageways for conveying lubricating oil from a source to each of said first and second passageways.

* * * * *